ns759B2

United States Patent
Molina

(10) Patent No.: US 9,578,259 B2
(45) Date of Patent: Feb. 21, 2017

(54) SYSTEMS AND METHODS FOR REDUCING MOTION BLUR IN IMAGES OR VIDEO IN ULTRA LOW LIGHT WITH ARRAY CAMERAS

(71) Applicant: Pelican Imaging Corporation, Santa Clara, CA (US)

(72) Inventor: Gabriel Molina, Palo Alto, CA (US)

(73) Assignee: FotoNation Cayman Limited, San Jose, CA (US)

( * ) Notice: Subject to any disclaimer, the term of this patent is extended or adjusted under 35 U.S.C. 154(b) by 0 days.

(21) Appl. No.: 14/776,553

(22) PCT Filed: Mar. 12, 2014

(86) PCT No.: PCT/US2014/025100
§ 371 (c)(1),
(2) Date: Sep. 14, 2015

(87) PCT Pub. No.: WO2014/159779
PCT Pub. Date: Oct. 2, 2014

(65) Prior Publication Data
US 2016/0044252 A1     Feb. 11, 2016

Related U.S. Application Data

(60) Provisional application No. 61/783,441, filed on Mar. 14, 2013.

(51) Int. Cl.
*H04N 5/272* (2006.01)
*H04N 5/225* (2006.01)
(Continued)

(52) U.S. Cl.
CPC ........... *H04N 5/272* (2013.01); *G06T 3/4015* (2013.01); *G06T 7/0065* (2013.01);
(Continued)

(58) Field of Classification Search
CPC ................. H04N 5/272; H04N 5/2258; H04N 5/232248; H04N 5/232264; H04N 5/235; H04N 5/2351; G06T 3/4015; G06T 7/0065
(Continued)

(56) References Cited

U.S. PATENT DOCUMENTS 4,124,798 A    11/1978  Thompson
4,198,646 A     4/1980  Alexander et al.
(Continued)

FOREIGN PATENT DOCUMENTS

CN        1839394 A     9/2006
CN      101064780 A    10/2007
(Continued)

OTHER PUBLICATIONS

US 8,957,977, 02/2015, Venkataraman et al. (withdrawn)
(Continued)

*Primary Examiner* — Tuan Ho
*Assistant Examiner* — Marly Camargo
(74) *Attorney, Agent, or Firm* — KPPB LLP

(57) ABSTRACT

Systems and methods for reducing motion blur in images or video in ultra low light with array cameras in accordance with embodiments of the invention are disclosed. In one embodiment, a method for synthesizing an image from multiple images captured using an array camera includes capturing image data using active cameras within an array camera, where the active cameras are configured to capture image data and the image data includes pixel brightness values that form alternate view images captured from different viewpoints, determining sets of corresponding pixels in the alternate view images where each pixel in a set of corresponding pixels is chosen from a different alternate view image, summing the pixel brightness values for cor- (Continued)

responding pixels to create pixel brightness sums for pixel locations in an output image, and synthesizing an output image from the viewpoint of the output image using the pixel brightness sums.

20 Claims, 5 Drawing Sheets

(51) Int. Cl.
- *G06T 3/40* (2006.01)
- *G06T 7/00* (2006.01)
- *H04N 5/232* (2006.01)
- *H04N 5/235* (2006.01)

(52) U.S. Cl.
CPC ........... *H04N 5/2258* (2013.01); *H04N 5/235* (2013.01); *H04N 5/2351* (2013.01); *H04N 5/23248* (2013.01); *H04N 5/23264* (2013.01)

(58) Field of Classification Search
USPC ........... 348/222, 208.6, 218.1; 382/254–301; 359/621
See application file for complete search history.

(56) References Cited

U.S. PATENT DOCUMENTS

| | | | |
|---|---|---|---|
| 4,323,925 A | 4/1982 | Abell et al. |
| 4,460,449 A | 7/1984 | Montalbano |
| 4,467,365 A | 8/1984 | Murayama et al. |
| 5,005,083 A | 4/1991 | Grage |
| 5,070,414 A | 12/1991 | Tsutsumi |
| 5,144,448 A | 9/1992 | Hornbaker |
| 5,327,125 A | 7/1994 | Iwase et al. |
| 5,629,524 A | 5/1997 | Stettner et al. |
| 5,808,350 A | 9/1998 | Jack et al. |
| 5,832,312 A | 11/1998 | Rieger et al. |
| 5,880,691 A | 3/1999 | Fossum et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,358,862 B1 | 3/2002 | Ireland et al. |
| 6,443,579 B1 | 9/2002 | Myers et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,657,218 B2 | 12/2003 | Noda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,795,253 B2 | 9/2004 | Shinohara |
| 6,819,358 B1 | 11/2004 | Kagle et al. |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,235,785 B2 | 6/2007 | Hornback et al. |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,606,484 B1 | 10/2009 | Richards et al. |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,212,914 B2 | 7/2012 | Chiu |
| 8,213,711 B2 | 7/2012 | Tam et al. |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,491 B2 | 8/2013 | Duparre |
| 8,541,730 B2 | 9/2013 | Inuiya |
| 8,542,933 B2 | 9/2013 | Venkataraman et al. |

(56) References Cited

U.S. PATENT DOCUMENTS

| | | |
|---|---|---|
| 8,553,093 B2 | 10/2013 | Wong et al. |
| 8,559,756 B2 | 10/2013 | Georgiev et al. |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman et al. |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Shpunt et al. |
| 9,031,335 B2 | 5/2015 | Venkataraman et al. |
| 9,031,342 B2 | 5/2015 | Venkataraman et al. |
| 9,031,343 B2 | 5/2015 | Venkataraman et al. |
| 9,036,928 B2 | 5/2015 | Venkataraman et al. |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,055,233 B2 | 6/2015 | Mullis et al. |
| 9,060,124 B2 | 6/2015 | Mullis et al. |
| 9,094,661 B2 | 7/2015 | Venkataraman et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Ciurea et al. |
| 2001/0005225 A1 | 6/2001 | Clark et al. |
| 2001/0019621 A1 | 9/2001 | Hanna et al. |
| 2001/0038387 A1 | 11/2001 | Tomooka et al. |
| 2002/0012056 A1 | 1/2002 | Trevino et al. |
| 2002/0027608 A1 | 3/2002 | Johnson et al. |
| 2002/0039438 A1 | 4/2002 | Mori et al. |
| 2002/0057845 A1 | 5/2002 | Fossum |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0096119 A1 | 5/2004 | Williams |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179834 A1 | 9/2004 | Szajewski et al. |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou |
| 2005/0009313 A1 | 1/2005 | Suzuki et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128595 A1 | 6/2005 | Shimizu |
| 2005/0132098 A1 | 6/2005 | Sonoda et al. |
| 2005/0134698 A1 | 6/2005 | Schroeder |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0033005 A1 | 2/2006 | Jerdev et al. |
| 2006/0034003 A1 | 2/2006 | Zalevsky |
| 2006/0038891 A1 | 2/2006 | Okutomi et al. |
| 2006/0039611 A1 | 2/2006 | Rother |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0214085 A1 | 9/2006 | Olsen |
| 2006/0239549 A1 | 10/2006 | Kelly et al. |
| 2006/0243889 A1 | 11/2006 | Farnworth et al. |
| 2006/0251410 A1 | 11/2006 | Trutna |

(56) References Cited

U.S. PATENT DOCUMENTS

| | | |
|---|---|---|
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0008575 A1 | 1/2007 | Yu et al. |
| 2007/0024614 A1 | 2/2007 | Tam |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0182843 A1 | 8/2007 | Shimamura et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen |
| 2007/0296847 A1 | 12/2007 | Chang et al. |
| 2008/0006859 A1 | 1/2008 | Mionetto et al. |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz |
| 2008/0099804 A1 | 5/2008 | Venezia et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0129667 A1 | 5/2009 | Ho |
| 2009/0140131 A1 | 6/2009 | Utagawa et al. |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0044815 A1 | 2/2010 | Chang et al. |
| 2010/0053342 A1 | 3/2010 | Hwang |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang et al. |
| 2010/0177411 A1 | 7/2010 | Hegde et al. |
| 2010/0194901 A1 | 8/2010 | van Hoorebeke et al. |
| 2010/0195716 A1 | 8/2010 | Klein Gunnewiek et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0231285 A1 | 9/2010 | Boomer et al. |
| 2010/0244165 A1 | 9/2010 | Lake et al. |
| 2010/0265381 A1 | 10/2010 | Yamamoto et al. |
| 2010/0265385 A1 | 10/2010 | Knight |
| 2010/0281070 A1 | 11/2010 | Chan et al. |
| 2010/0289941 A1 | 11/2010 | Ito |
| 2010/0302423 A1 | 12/2010 | Adams, Jr. et al. |
| 2010/0309292 A1 | 12/2010 | Ho et al. |
| 2010/0321595 A1 | 12/2010 | Chiu et al. |
| 2011/0001037 A1 | 1/2011 | Tewinkle |
| 2011/0018973 A1 | 1/2011 | Takayama |
| 2011/0019243 A1 | 1/2011 | Constant, Jr. et al. |
| 2011/0031381 A1 | 2/2011 | Tay et al. |

(56) References Cited

U.S. PATENT DOCUMENTS

| | | |
|---|---|---|
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic |
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1 | 11/2011 | McMahon |
| 2011/0285866 A1 | 11/2011 | Bhrugumalla et al. |
| 2011/0285910 A1 | 11/2011 | Bamji et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain et al. |
| 2012/0023456 A1 | 1/2012 | Sun et al. |
| 2012/0026297 A1 | 2/2012 | Sato |
| 2012/0026342 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0062702 A1 | 3/2012 | Jiang et al. |
| 2012/0069235 A1 | 3/2012 | Imai |
| 2012/0105691 A1 | 5/2012 | Waqas et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0163672 A1 | 6/2012 | McKinnon et al. |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0219236 A1 | 8/2012 | Ali et al. |
| 2012/0229602 A1 | 9/2012 | Chen et al. |
| 2012/0229628 A1 | 9/2012 | Ishiyama et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0262607 A1 | 10/2012 | Shimura et al. |
| 2012/0268574 A1 | 10/2012 | Gidon et al. |
| 2012/0287291 A1 | 11/2012 | McMahon et al. |
| 2012/0293695 A1 | 11/2012 | Tanaka |
| 2012/0307099 A1 | 12/2012 | Yahata et al. |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0076967 A1 | 3/2013 | Brunner et al. |
| 2013/0077880 A1 | 3/2013 | Venkataraman et al. |
| 2013/0077882 A1 | 3/2013 | Venkataraman et al. |
| 2013/0088489 A1 | 4/2013 | Schmeitz et al. |
| 2013/0088637 A1 | 4/2013 | Duparre |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0176394 A1 | 7/2013 | Tian et al. |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0230237 A1 | 9/2013 | Schlosser et al. |
| 2013/0259317 A1 | 10/2013 | Gaddy |
| 2013/0265459 A1 | 10/2013 | Duparre et al. |
| 2013/0274923 A1 | 10/2013 | By et al. |
| 2013/0293760 A1 | 11/2013 | Nisenzon et al. |
| 2014/0009586 A1 | 1/2014 | McNamer et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0079336 A1 | 3/2014 | Venkataraman et al. |
| 2014/0092281 A1 | 4/2014 | Nisenzon et al. |
| 2014/0104490 A1 | 4/2014 | Hsieh et al. |
| 2014/0118493 A1 | 5/2014 | Sali et al. |
| 2014/0132810 A1 | 5/2014 | McMahon |
| 2014/0146201 A1 | 5/2014 | Knight et al. |
| 2014/0176592 A1 | 6/2014 | Wilburn et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |

(56) References Cited

U.S. PATENT DOCUMENTS

| | | | |
|---|---|---|---|
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0091900 A1 | 4/2015 | Yang et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |

FOREIGN PATENT DOCUMENTS

| | | | |
|---|---|---|---|
| CN | 101883291 A | 11/2010 |
| EP | 840502 A2 | 5/1998 |
| EP | 1201407 A2 | 5/2002 |
| EP | 1355274 A2 | 10/2003 |
| EP | 1734766 A2 | 12/2006 |
| EP | 2104334 A1 | 9/2009 |
| EP | 2336816 A2 | 6/2011 |
| JP | 59-025483 | 9/1984 |
| JP | 64-037177 | 7/1989 |
| JP | 02-285772 A | 11/1990 |
| JP | 11142609 A | 5/1999 |
| JP | 11223708 A | 8/1999 |
| JP | 2000209503 A | 7/2000 |
| JP | 2002205310 A | 7/2002 |
| JP | 2002252338 A | 9/2002 |
| JP | 2003094445 A | 4/2003 |
| JP | 2003163938 A | 6/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2006033493 A | 2/2006 |
| JP | 2006047944 A | 2/2006 |
| JP | 2006258930 A | 9/2006 |
| JP | 2007520107 A | 7/2007 |
| JP | 2008055908 A | 3/2008 |
| JP | 2008507874 A | 3/2008 |
| JP | 2008258885 A | 10/2008 |
| JP | 2009132010 A | 6/2009 |
| JP | 2011109484 A | 6/2011 |
| JP | 2013526801 A | 6/2013 |
| JP | 2014521117 A | 8/2014 |
| KR | 1020110097647 A | 8/2011 |
| TW | 200939739 A | 9/2009 |
| WO | 2005057922 A1 | 6/2005 |
| WO | 2007083579 A1 | 7/2007 |
| WO | 2007134137 A2 | 11/2007 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2011008443 A2 | 1/2011 |
| WO | 2011055655 A1 | 5/2011 |
| WO | 2011063347 A2 | 5/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
International Search Report and Written Opinion for International Application PCT/US2014/064693, Completed Mar. 7, 2015, mailed Apr. 2, 2015, 15 pgs.
Extended European Search Report for European Application EP12782935.6, report completed Aug. 28, 2014 mailed Sep. 4, 2014, 6 Pgs.
Extended European Search Report for European Application EP12804266.0, Report Completed Jan. 27, 2015, mailed Feb. 3, 2015, 6 Pgs.
Extended European Search Report for European Application EP12835041.0, Report Completed Jan. 28, 2015, mailed Feb. 4, 2015, 6 Pgs.
International Preliminary Report on Patentability for International Application No. PCT/US2012/059813, Search Completed Apr. 15, 2014, 7 pgs.
International Preliminary Report on Patentability for International Application No. PCT/US2013/059991, Issued Mar. 17, 2015, mailed Mar. 26, 2015, 8 pgs.
International Preliminary Report on Patentability for International Application PCT/US13/56065, Report Issued Feb. 24, 2015, mailed Mar. 5, 2015, 4 Pgs.
International Preliminary Report on Patentability for International Application PCT/US2013/024987, mailed Aug. 21, 2014, 13 Pgs.
International Preliminary Report on Patentability for International Application PCT/US2013/027146, completed Apr. 2, 2013, Issued Aug. 26, 2014, 10 pages.

(56) References Cited

OTHER PUBLICATIONS

International Preliminary Report and Written Opinion for International Application PCT/US2013/039155, completed Nov. 4, 2014, mailed Nov. 13, 2014, 10 Pgs.
International Preliminary Report on Patentability for International Application PCT/US2013/046002, issued Dec. 31, 2014, mailed Jan. 8, 2015, 6 Pgs.
International Preliminary Report on Patentability for International Application PCT/US2013/048772, issued Dec. 31, 2014, Mailed Jan. 8, 2015, 8 Pgs.
International Preliminary Report on Patentability for International Application PCT/US2013/056502, Issued Feb. 24, 2015, Mailed Mar. 5, 2015, 7 Pgs.
International Preliminary Report on Patentability for International Application PCT/US2013/069932, issued May 19, 2015, Mailed May 28, 2015, 14 Pgs.
International Preliminary Report on Patentability for International Application PCT/US2014/023762, issued Mar. 2, 2015, Mailed Mar. 9, 2015, 10 Pgs.
International Preliminary Report on Patentability for International Application PCT/US2014/025100, issued Sep. 15, 2015, Mailed Sep. 24, 2015, 4 Pgs.
International Preliminary Report on Patentability for International Application PCT/US13/62720, Report Issued Mar. 31, 2015, Mailed Apr. 9, 2015, 8 Pgs.
International Search Report and Written Opinion for International Application No. PCT/US13/46002, completed Nov. 13, 2013, Mailed Nov. 29, 2013, 7 pgs.
International Search Report and Written Opinion for International Application No. PCT/US13/56065, Completed Nov. 25, 2013, Mailed Nov. 26, 2013, 8 pgs.
International Search Report and Written Opinion for International Application No. PCT/US13/59991, Completed Feb. 6, 2014, Mailed Feb. 26, 2014, 8 pgs.
International Search Report and Written Opinion for International Application No. PCT/US2009/044687, completed Jan. 5, 2010, date mailed Jan. 13, 2010, 9 pgs.
International Search Report and Written Opinion for International Application No. PCT/US2011/64921, Completed Feb. 25, 2011, mailed Mar. 6, 2012, 17 pgs.
International Search Report and Written Opinion for International Application No. PCT/US2013/024987, Completed Mar. 27, 2013, Mailed Apr. 15, 2013, 14 pgs.
International Search Report and Written Opinion for International Application No. PCT/US2013/027146, completed Apr. 2, 2013, 12 pgs.
International Search Report and Written Opinion for International Application No. PCT/US2013/039155, completed Jul. 1, 2013, Mailed Jul. 11, 2013, 11 Pgs.
International Search Report and Written Opinion for International Application No. PCT/US2013/048772, Completed Oct. 21, 2013, Mailed Nov. 8, 2013, 11 pgs.
International Search Report and Written Opinion for International Application No. PCT/US2013/056502, Completed Feb. 18, 2014, Mailed Mar. 19, 2014, 7 pgs.
International Search Report and Written Opinion for International Application No. PCT/US2013/069932, Completed Mar. 14, 2014, Mailed Apr. 14, 2014, 12 pgs.
International Search Report and Written Opinion for International Application No. PCT/US2015/019529, completed May 5, 2015, Mailed Jun. 8, 2015, 10 Pgs.
International Search Report and Written Opinion for International Application PCT/US11/36349, mailed Aug. 22, 2011, 11 pgs.
International Search Report and Written Opinion for International Application PCT/US13/62720, completed Mar. 25, 2014, Mailed Apr. 21, 2014, 9 Pgs.
International Search Report and Written Opinion for International Application PCT/US14/024903 completed Jun. 12, 2014, Mailed, Jun. 27, 2014, 13 pgs.
International Search Report and Written Opinion for International Application PCT/US14/17766, completed May 28, 2014, Mailed Jun. 18, 2014, 9 Pgs.
International Search Report and Written Opinion for International Application PCT/US14/18084, report completed May 23, 2014, Mailed Jun. 10, 2014, 12 Pgs.
International Search Report and Written Opinion for International Application PCT/US14/18116, completed May 13, 2014, Mailed Jun. 2, 2014, 12 Pgs.
International Search Report and Written Opinion for International Application PCT/US14/22118, completed Jun. 9, 2014, Mailed, Jun. 25, 2014, 5 pgs.
International Search Report and Written Opinion for International Application PCT/US14/22774 completed Jun. 9, 2014, Mailed Jul. 14, 2014, 6 Pgs.
International Search Report and Written Opinion for International Application PCT/US14/24407, completed Jun. 11, 2014, Mailed Jul. 8, 2014, 9 Pgs.
International Search Report and Written Opinion for International Application PCT/US14/25100, completed Jul. 7, 2014, Mailed Aug. 7, 2014 5 Pgs.
International Search Report and Written Opinion for International Application PCT/US14/25904, completed Jun. 10, 2014, Mailed Jul. 10, 2014, 6 Pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US2012/37670, Mailed Jul. 18, 2012, Completed Jul. 5, 2012, 9 pgs.
International Search Report and Written Opinion for International Application PCT/US2012/58093, Report completed Nov. 15, 2012, 12 pgs.
International Search Report and Written Opinion for International Application PCT/US2014/022123, completed Jun. 9, 2014, Mailed Jun. 25, 2014, 5 pgs.
International Search Report and Written Opinion for International Application PCT/US2014/024947, Completed Jul. 8, 2014, Mailed Aug. 5, 2014, 8 Pgs.
International Search Report and Written Opinion for International Application PCT/US2014/028447, completed Jun. 30, 2014, Mailed Jul. 21, 2014, 8 Pgs.
International Search Report and Written Opinion for International Application PCT/US2014/030692, completed Jul. 28, 2014, Mailed Aug. 27, 2014, 7 Pages.
International Search Report and Written Opinion for International Application PCT/US2014/066229, Completed Mar. 6, 2015, Mailed Mar. 19, 2015, 9 Pgs.
International Search Report and Written Opinion for International Application PCT/US2014/067740, Completed Jan. 29, 2015, Mailed Mar. 3 2015, 10 pgs.
International Search Report and Written Opinion for International Application PCT/US2014/23762, Completed May 30, 2014, Mailed Jul. 3, 2014, 6 Pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.

(56) References Cited

OTHER PUBLICATIONS

Bishop et al., "Light Field Superresolution", Retrieved from http://home.eps.hw.ac.uk/~sz73/ICCP09/LightFieldSuperresolution.pdf, 9 pgs.

Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.

Borman, "Topics in Multiframe Superresolution Restoration", Thesis of Sean Borman, Apr. 2004, 282 pgs.

Borman et al, "Image Sequence Processing", Source unknown, Oct. 14, 2002, 81 pgs.

Borman et al., "Block-Matching Sub-Pixel Motion Estimation from Noisy, Under-Sampled Frames—An Empirical Performance Evaluation", Proc SPIE, Dec. 1998, 3653, 10 pgs.

Borman et al., "Image Resampling and Constraint Formulation for Multi-Frame Super-Resolution Restoration", Proc. SPIE, Jun. 2003, 5016, 12 pgs.

Borman et al., "Linear models for multi-frame super-resolution restoration under non-affine registration and spatially varying PSF", Proc. SPIE, May 2004, vol. 5299, 12 pgs.

Borman et al., "Nonlinear Prediction Methods for Estimation of Clique Weighting Parameters in NonGaussian Image Models", Proc. SPIE, 1998. 3459, 9 pgs.

Borman et al., "Simultaneous Multi-Frame MAP Super-Resolution Video Enhancement Using Spatio-Temporal Priors", Image Processing, 1999, ICIP 99 Proceedings, vol. 3, pp. 469-473.

Borman et al., "Super-Resolution from Image Sequences—A Review", Circuits & Systems, 1998, pp. 374-378.

Bose et al., "Superresolution and Noise Filtering Using Moving Least Squares", IEEE Transactions on Image Processing, date unknown, 21 pgs.

Boye et al., "Comparison of Subpixel Image Registration Algorithms", Proc. of SPIE-IS&T Electronic Imaging, vol. 7246, pp. 72460X-1-72460X-9.

Bruckner et al., "Artificial compound eye applying hyperacuity", Optics Express, Dec. 11, 2006, vol. 14, No. 25, pp. 12076-12084.

Bruckner et al., "Driving microoptical imaging systems towards miniature camera applications", Proc. SPIE, Micro-Optics, 2010, 11 pgs.

Bruckner et al., "Thin wafer-level camera lenses inspired by insect compound eyes", Optics Express, Nov. 22, 2010, vol. 18, No. 24, pp. 24379-24394.

Capel, "Image Mosaicing and Super-resolution", [online], Retrieved on Nov. 10, 2012 (Nov. 10, 2012). Retrieved from the Internet at URL:<http://citeseerx.ist.psu.edu/viewdoc/download-?doi=10.1.1.226.2643&rep=rep1 &type=pdf>, Title pg., abstract, table of contents, pp. 1-263 (269 total pages).

Chan et al., "Extending the Depth of Field in a Compound-Eye Imaging System with Super-Resolution Reconstruction", Proceedings—International Conference on Pattern Recognition, 2006, vol. 3, pp 623-626.

Chan et al., "Investigation of Computational Compound-Eye Imaging System with Super-Resolution Reconstruction", IEEE, ISASSP 2006, pp. 1177-1180.

Chan et al., "Super-resolution reconstruction in a computational compound-eye imaging system", Multidim Syst Sign Process, 2007, vol. 18, pp. 83-101.

Chen et al., "Interactive deformation of light fields", In Proceedings of SIGGRAPH I3D 2005, pp. 139-146.

Chen et al., "KNN Matting", IEEE Transactions on Pattern Analysis and Machine Intelligence, Sep. 2013, vol. 35, No. 9, pp. 2175-2188.

Drouin et al., "Fast Multiple-Baseline Stereo with Occlusion", Proceedings of the Fifth International Conference on 3-D Digital Imaging and Modeling, 2005, 8 pgs.

Drouin et al., "Geo-Consistency for Wide Multi-Camera Stereo", Proceedings of the 2005 IEEE Computer Society Conference on Computer Vision and Pattern Recognition, 2005, 8 pgs.

Drouin et al., "Improving Border Localization of Multi-Baseline Stereo Using Border-Cut", International Journal of Computer Vision, Jul. 2009, vol. 83, Issue 3, 8 pgs.

Duparre et al., "Artificial apposition compound eye fabricated by micro-optics technology", Applied Optics, Aug. 1, 2004, vol. 43, No. 22, pp. 4303-4310.

Duparre et al., "Artificial compound eye zoom camera", Bioinspiration & Biomimetics, 2008, vol. 3, pp. 1-6.

Duparre et al., "Artificial compound eyes—different concepts and their application to ultra flat acquisition sensors", MOEMS and Miniaturized Systems IV, Proc. SPIE 5346, Jan. 2004, pp. 89-100.

Duparre et al., "Chirped arrays of refractive ellipsoidal microlenses for aberration correction under oblique incidence", Optics Express, Dec. 26, 2005, vol. 13, No. 26, pp. 10539-10551.

Duparre et al., "Micro-optical artificial compound eyes", Bioinspiration & Biomimetics, 2006, vol. 1, pp. R1-R16.

Duparre et al., "Microoptical artificial compound eyes—from design to experimental verification of two different concepts", Proc. of SPIE, Optical Design and Engineering II, vol. 5962, pp. 59622A-1-59622A-12.

Duparre et al., "Microoptical Artificial Compound Eyes—Two Different Concepts for Compact Imaging Systems", 11th Microoptics Conference, Oct. 30-Nov. 2, 2005, 2 pgs.

Duparre et al., "Microoptical telescope compound eye", Optics Express, Feb. 7, 2005, vol. 13, No. 3, pp. 889-903.

Duparre et al., "Micro-optically fabricated artificial apposition compound eye", Electronic Imaging—Science and Technology, Prod. SPIE 5301, Jan. 2004, pp. 25-33.

Duparre et al., "Novel Optics/Micro-Optics for Miniature Imaging Systems", Proc. of SPIE, 2006, vol. 6196, pp. 619607-1-619607-15.

Duparre et al., "Theoretical analysis of an artificial superposition compound eye for application in ultra flat digital image acquisition devices", Optical Systems Design, Proc. SPIE 5249, Sep. 2003, pp. 408-418.

Duparre et al., "Thin compound-eye camera", Applied Optics, May 20, 2005, vol. 44, No. 15, pp. 2949-2956.

Duparre et al., "Ultra-Thin Camera Based on Artificial Apposistion Compound Eyes", 10th Microoptics Conference, Sep. 1-3, 2004, 2 pgs.

Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 163 pgs.

Farrell et al., "Resolution and Light Sensitivity Tradeoff with Pixel Size", Proceedings of the SPIE Electronic Imaging 2006 Conference, 2006, vol. 6069, 8 pgs.

Farsiu et al., "Advances and Challenges in Super-Resolution", International Journal of Imaging Systems and Technology, 2004, vol. 14, pp. 47-57.

Farsiu et al., "Fast and Robust Multiframe Super Resolution", IEEE Transactions on Image Processing, Oct. 2004, vol. 13, No. 10, pp. 1327-1344.

Farsiu et al., "Multiframe Demosaicing and Super-Resolution of Color Images", IEEE Transactions on Image Processing, Jan. 2006, vol. 15, No. 1, pp. 141-159.

Feris et al., "Multi-Flash Stereopsis: Depth Edge Preserving Stereo with Small Baseline Illumination", IEEE Trans on PAMI, 2006, 31 pgs.

Fife et al., "A 3D Multi-Aperture Image Sensor Architecture", Custom Integrated Circuits Conference, 2006, CICC '06, IEEE, pp. 281-284.

Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.

Fischer et al., "Optical System Design", 2nd Edition, SPIE Press, pp. 191-198.

Fischer et al. "Optical System Design", 2nd Edition, SPIE Press, pp. 49-58.

Goldman et al., "Video Object Annotation, Navigation, and Composition", In Proceedings of UIST 2008, pp. 3-12.

Gortler et al., "The Lumigraph", In Proceedings of SIGGRAPH 1996, pp. 43-54

(56) References Cited

OTHER PUBLICATIONS

Hacohen et al., "Non-Rigid Dense Correspondence with Applications for Image Enhancement", ACM Transactions on Graphics, 30, 4, 2011, pp. 70:1-70:10.

Hamilton, "JPEG File Interchange Format, Version 1.02", Sep. 1, 1992, 9 pgs.

Hardie, "A Fast Image Super-Algorithm Using an Adaptive Wiener Filter", IEEE Transactions on Image Processing, Dec. 2007, vol. 16, No. 12, pp. 2953-2964.

Hasinoff et al., "Search-and-Replace Editing for Personal Photo Collections", Computational Photography (ICCP) 2010, pp. 1-8

Horisaki et al., "Irregular Lens Arrangement Design to Improve Imaging Performance of Compound-Eye Imaging Systems", Applied Physics Express, 2010, vol. 3, pp. 022501-1-022501-3.

Horisaki et al., "Superposition Imaging for Three-Dimensionally Space-Invariant Point Spread Functions", Applied Physics Express, 2011, vol. 4, pp. 112501-1-112501-3.

Horn et al., "LightShop: Interactive Light Field Manipulation and Rendering", In Proceedings of I3D 2007, pp. 121-128.

Isaksen et al., "Dynamically Reparameterized Light Fields", In Proceedings of SIGGRAPH 2000, pp. 297-306.

Jarabo et al., "Efficient Propagation of Light Field Edits", In Proceedings of SIACG 2011, pp. 75-80.

Joshi, et al. "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http:l/ieeexplore.ieee.org/stamp/stamp.jsp?tp=&arnumber=4409032&isnumber=4408819>; pp. 1-8.

Kang et al., "Handling Occlusions inn Dense Multi-View Stereo", Computer Vision and Pattern Recognition, 2001, vol. 1, pp. I-103-I-110.

Kitamura et al., "Reconstruction of a high-resolution image on a compound-eye image-capturing system", Applied Optics, Mar. 10, 2004, vol. 43, No. 8, pp. 1719-1727.

Krishnamurthy et al., "Compression and Transmission of Depth Maps for Image-Based Rendering", Image Processing, 2001, pp. 828-831.

Kutulakos et al., "Occluding Contour Detection Using Affine Invariants and Purposive Viewpoint Control", Proc., CVPR 94, 8 pgs.

Lai et al., "A Large-Scale Hierarchical Multi-View RGB-D Object Dataset", source and date unknown, 8 pgs.

Lee et al., "Electroactive Polymer Actuator for Lens-Drive Unit in Auto-Focus Compact Camera Module", ETRI Journal, vol. 31, No. 6, Dec. 2009, pp. 695-702.

Lensvector, "How LensVector Autofocus Works", printed Nov. 2, 2012 from http://www.lensvector.com/overview.html, 1 pg.

Levin et al., "A Closed Form Solution to Natural Image Matting", Pattern Analysis and Machine Intelligence, Feb. 2008, vol. 30, 8 pgs.

Levoy, "Light Fields and Computational Imaging", IEEE Computer Society, Aug. 2006, pp. 46-55.

Levoy et al., "Light Field Rendering", Proc. ADM SIGGRAPH '96, pp. 1-12.

Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.

Liu et al., "Virtual View Reconstruction Using Temporal Information", 2012 IEEE International Conference on Multimedia and Expo, 2012, pp. 115-120.

Lo et al., "Stereoscopic 3D Copy & Paste", ACM Transactions on Graphics, vol. 29, No. 6, Article 147, Dec. 2010, pp. 147:1-147:10.

Merkle et al., "Adaptation and optimization of coding algorithms for mobile 3DTV", Mobile3DTV Project No. 216503, 55 pgs.

Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.

Moreno-Noguer et al. "Active Refocusing of Images and Videos", ACM SIGGRAPH, 2007, vol. 26, pp. 1-10, [retrieved on Jul. 8, 2015], Retrieved from the Internet <U RL:http://doi.acm.org/10.1145/1276377.1276461 >.

Muehlebach, "Camera Auto Exposure Control for VSLAM Applications", Studies on Mechatronics, Swiss Federal Institute of Technology Zurich, Autumn Term 2010 course, 67 pgs.

Nayar, "Computational Cameras: Redefining the Image", IEEE Computer Society, Aug. 2006, pp. 30-38.

Ng, "Digital Light Field Photography", Thesis, Jul. 2006, 203 pgs.

Ng et al., "Super-Resolution Image Restoration from Blurred Low-Resolution Images", Journal of Mathematical Imaging and Vision, 2005, vol. 23, pp. 367-378.

Nitta et al., "Image reconstruction for thin observation module by bound optics by using the iterative backprojection method", Applied Optics, May 1, 2006, vol. 45, No. 13, pp. 2893-2900.

Nomura et al., "Scene Collages and Flexible Camera Arrays", Proceedings of Eurographics Symposium on Rendering, 2007, 12 pgs.

Park et al., "Super-Resolution Image Reconstruction", IEEE Signal Processing Magazine, May 2003, pp. 21-36.

Perwass et al., "Single Lens 3D-Camera with Extended Depth-of-Field", printed from www.raytrix.de, 15 pgs.

Pham et al., "Robust Super-Resolution without Regularization", Journal of Physics: Conference Series 124, 2008, pp. 1-19

Philips 3D Solutions, "3D Interface Specifications, White Paper", Philips 3D Solutions retrieved from www.philips.com/3dsolutions, 29 pgs., Feb. 15, 2008.

Polight, "Designing Imaging Products Using Reflowable Autofocus Lenses", http://www.polight.no/tunable-polymer-autofocus-lens-html--11.html.

Pouydebasquea et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.

Protter et al., "Generalizing the Nonlocal-Means to Super-Resolution Reconstruction", IEEE Transaction on Image Processing, Jan. 2009, vol. 18, No. 1, pp. 36-51.

Radtke et al., "Laser lithographic fabrication and characterization of a spherical artificial compound eye", Optics Express, Mar. 19, 2007, vol. 15, No. 6, pp. 3067-3077.

Rajan et al. "Simultaneous Estimation of Super Resolved Scene and Depth Map from Low Resolution Defocused Observations", IEEE Computer Society, vol. 25, No. 9; Sep. 2003; pp. 1-16.

Rander, et al., "Virtualized Reality: Constructing Time-Varying Virtual Worlds From Real World Events", Proc. of IEEE Visualization '97, Phoenix, Arizona, Oct. 19-24, 1997, pp. 277-283, 552.

Rhemann et al, "Fast Cost-Volume Filtering for Visual Correspondence and Beyond", IEEE Trans. Pattern Anal. Mach. Intell, 2013, vol. 35, No. 2, pp. 504-511.

Robertson et al., "Dynamic Range Improvement Through Multiple Exposures", In Proc. of the Int. Conf. on Image Processing, 1999, 5 pgs.

Robertson et al., "Estimation—theoretic approach to dynamic range enhancement using multiple exposures", Journal of Electronic Imaging, Apr. 2003, vol. 12, No. 2, pp. 219-228.

Roy et al., "Non-Uniform Hierarchical Pyramid Stereo for Large Images", Computer and Robot Vision, 2007, pp. 208-215.

Sauer et al., "Parallel Computation of Sequential Pixel Updates in Statistical Tomographic Reconstruction", ICIP 1995, pp. 93-96.

Seitz et al., "Plenoptic Image Editing", International Journal of Computer Vision 48, 2, pp. 115-129.

Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.

(56) References Cited

OTHER PUBLICATIONS

Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematoprapher 77, 9 (Sept.), 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", 10 pgs.

Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter_(photography), 1 pg.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zhang et al. "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.
Crabb et al., "Real-time foreground segmentation via range and color imaging", Computer Vision and Pattern Recognition Workshops, 2008. CVPRW'08. IEEE Computer Society Conference on. IEEE, 2008, 5 pgs.
Eng, Wei Yong et al., "Gaze correction for 3D tele-immersive communication system", IVMSP Workshop, 2013 IEEE 11th. IEEE, 2013 Jun 10, 4 pgs.
Wu et al., "A Virtual View Synthesis Algorithm Based on Image Inpainting", 2012 Third International Conference on Networking and Distributed Computing. IEEE, 2012, pgs. 153-156.

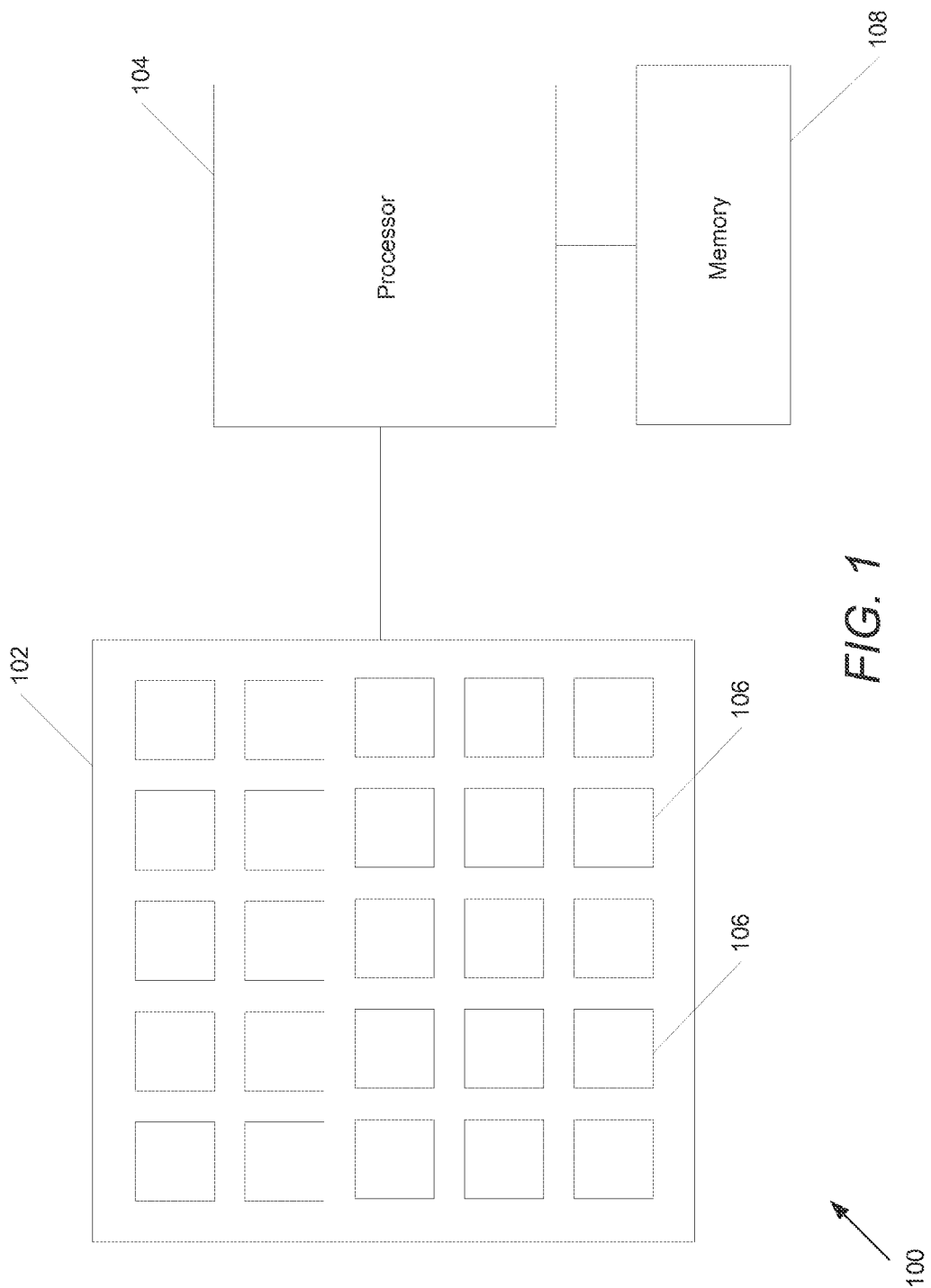

SYSTEMS AND METHODS FOR REDUCING MOTION BLUR IN IMAGES OR VIDEO IN ULTRA LOW LIGHT WITH ARRAY CAMERAS

FIELD OF THE INVENTION

The present invention relates generally to capturing digital images and video and more specifically to the use of array cameras to reduce motion blur and/or noise when capturing images and video in low light conditions.

BACKGROUND OF THE INVENTION

Low light image capture traditionally presents challenges in producing images without excessive blurring or noise. Settings on a digital camera can typically be adjusted to compensate for low light conditions. In a digital camera, individual image sensors corresponding to pixels in an output image receive light over a predetermined exposure time (also called integration time). The exposure setting of an image sensor is typically the duration of time which light is sampled by individual pixel(s) in the image sensor. An analog gain is typically implemented through a circuit that amplifies the analog signal from a sensor before it is converted to a digital signal and processed. The exposure and gain settings on image sensors in the camera are particularly relevant in low light conditions, as increases in exposure and gain generally increase the voltage level of a pixel and thereby its apparent brightness. Under low light conditions the use of a longer exposure time can provide a brighter image but may result in motion blur, where moving objects in the scene are blurred because of movement over the time that light associated with those objects is being received by the camera. Increasing the gain can also provide a brighter image but can result in amplified noise artifacts.

SUMMARY OF THE INVENTION

Systems and methods for reducing motion blur in images or video in ultra low light with array cameras in accordance with embodiments of the invention are disclosed. In one embodiment, a method for synthesizing an image from multiple images captured from different viewpoints using an array camera includes capturing image data using active cameras within an array camera, where the active cameras are configured to capture image data and the image data captured by the active cameras includes pixel brightness values that form alternate view images captured from different viewpoints, determining sets of corresponding pixels in the alternate view images where each pixel in a set of corresponding pixels is chosen from a different alternate view image, summing the pixel brightness values for corresponding pixels in the alternate view images to create pixel brightness sums for pixel locations in an output image, and synthesizing an output image from the viewpoint of the output image using the pixel brightness sums for the pixel locations in the output image.

BRIEF DESCRIPTION OF THE DRAWINGS

FIG. 1 is a conceptual illustration of an array camera architecture that can be used in a variety of array camera configurations in accordance with embodiments of the invention.

DETAILED DISCLOSURE OF THE INVENTION

Figure 1A:
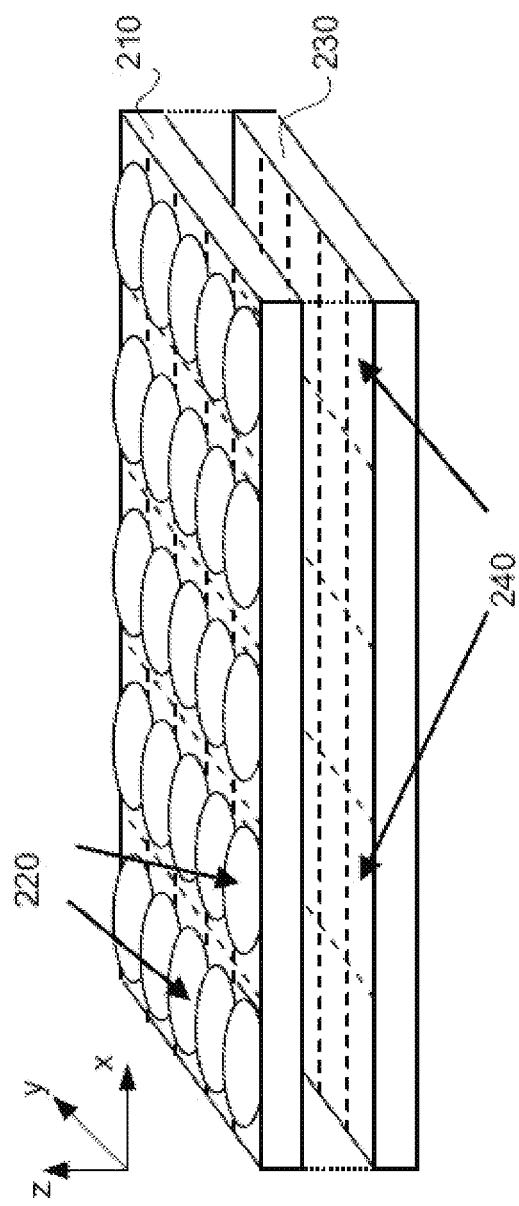
FIG. 1A conceptually illustrates an optic array and an imager array in an array camera module in accordance with an embodiment of the invention.

Turning now to the drawings, systems and methods for reducing motion blur in images or video in ultra low light with array cameras in accordance with embodiments of the invention are illustrated. Array cameras including camera modules that can be utilized to capture image data from different viewpoints are disclosed in U.S. patent application Ser. No. 12/935,504, entitled "Capturing and Processing of Images using Monolithic Camera Array with Heteregeneous Images", filed May 20, 2009, the disclosure of which is incorporated by reference herein in its entirety. Array cameras offer a number of advantages and features over legacy cameras. An array camera typically contains two or more imagers (which can be referred to as cameras), each of which receives light through a separate lens system. The imagers operate to capture image data of a scene from slightly different viewpoints. Array cameras have a variety of applications, including capturing image data from multiple viewpoints that can be used in super-resolution processing and depth calculation. Imagers in the array may sense different wavelengths of light (e.g., red, green, blue, Infrared) with the application of selective filters, which can improve performance under different lighting conditions and the performance of image processing processes performed on image data captured using the array.

Array cameras in accordance with many embodiments of the invention improve the quality of images captured in low light conditions by summing the brightness of corresponding pixels from different cameras. Low light image capture is particularly challenging because the exposure time needed for a camera to receive a sufficient amount of light to produce an image can result in motion blur. Alternatively, if gain is increased to raise brightness levels, the noise level may be increased commensurately. In various embodiments of the invention, image data from a subset of cameras (imagers) in an array camera are chosen and pixel brightness values of corresponding pixels in the image data are summed, producing higher brightness levels. By summing pixel brightness values from a pixel in a reference image with a corresponding pixel from one or more alternate view image(s), the effective exposure time of the pixel in the reference image is increased by a factor equal to the number of summed pixels. Increasing exposure time can enable a reduction in analog gain and the associated noise. By exposing multiple pixels in parallel, the capture time can be significantly shorter than the effective exposure time of the pixel brightness values obtained in the reference viewpoint by summing corresponding pixels. The opportunity for motion artifacts to be present in captured image data increases with increased exposure time. Therefore, enabling an effective exposure time that is significantly longer than the actual exposure time of the pixels in the reference camera will decrease the likelihood that motion artifacts will appear in the captured image data. In addition, providing an increased effective exposure time relative to the actual capture time can provide improved low light video capture performance, where exposure time is constrained by the frame rate of the video.

In a number of embodiments, image data captured by active cameras in an array camera module is rectified (i.e. scene independent geometric shifts are applied to the image data captured by the cameras) and the rectified image data is summed. In several embodiments, parallax detection and protection processes are performed to identify scene dependent geometric corrections to apply to the image data. Systems and methods for performing parallax detection and correction are disclosed in U.S. Provisional Patent Application No. 61/691,666 entitled "Systems and Methods for Parallax Detection and Correction in Imaged Captured Using Array Cameras" to Venkataraman et al. and U.S. Pat. No. 8,619,082 entitled "Systems and Methods for Parallax Detection and Correction in Images Captured Using Array Cameras that Contain Occlusions using Subsets of Images to Perform Depth Estimation" to Ciurea et al., the disclosures of which are incorporated by reference herein in their entirety. The pixel brightness values in the image data can be summed following application of the scene dependent geometric corrections. Array cameras and methods for capturing images in low lighting conditions in accordance with embodiments of the invention are discussed further below.

Array Camera Architecture

An array camera architecture that can be used in a variety of array camera configurations in accordance with embodiments of the invention is illustrated in FIG. 1. The array camera 100 includes an imager array 102, which is connected to a processor 104. Imagers 106 in the array 102 are evenly spaced in a 5×5 square. In other embodiments, imagers may have different spacing or can be arranged in other orientations in the array. The processor 104 is hardware, software, firmware, or a combination thereof that controls various operating parameters of the imager array 102. The processor 104 can also function to process the images received from imager array 102 to produce a synthesized higher resolution image using super resolution processes, or transfer the images to other hardware, software, firmware or a combination thereof to process the images. The system can also include memory 108 in communication with the processor 104 for storing images. Architectures for imager arrays that can be utilized in accordance with embodiments of the invention include those disclosed in U.S. patent application Ser. No. 13/106,797, entitled "Architectures for System on Chip Array Cameras" to Pain et al., the disclosure of which is incorporated herein by reference in its entirety.

Although a specific architecture is illustrated in FIG. 1, any of a variety of architectures that enable the capture of low resolution images and application of super resolution processes to produce a synthesized high resolution image can be utilized in accordance with embodiments of the invention.

Array Camera Modules

Camera modules in accordance with many embodiments of the invention can be constructed from an imager array and an optic array. A camera module in accordance with an embodiment of the invention is illustrated in FIG. 1A. The camera module 200 includes an imager array 230 including an array of focal planes 240 along with a corresponding optic array 210 including an array of lens stacks 220. Within the array of lens stacks, each lens stack 220 creates an optical channel that forms an image of the scene on an array of light sensitive pixels within a corresponding focal plane 240. Each pairing of a lens stack 220 and focal plane 240 forms a single camera 104 within the camera module. Each pixel within a focal plane 240 of a camera 104 generates image data that can be sent from the camera 104 to the processor 108. In many embodiments, the lens stack within each optical channel is configured so that pixels of each focal plane 240 sample the same object space or region within the scene. In several embodiments, the lens stacks are configured so that the pixels that sample the same object space do so with sub-pixel offsets to provide sampling diversity that can be utilized to recover increased resolution through the use of super-resolution processes.

In several embodiments, color filters in individual cameras can be used to pattern the camera module with π filter groups as further discussed in U.S. Provisional Patent Application No. 61/641,165 entitled "Camera Modules Patterned with pi Filter Groups", to Nisenzon et al. filed May 1, 2012, the disclosure of which is incorporated by reference herein in its entirety. These cameras can be used to capture data with respect to different colors, or a specific portion of the spectrum. In contrast to applying color filters to the pixels of the camera, color filters in many embodiments of the invention are included in the lens stack. For example, a green color camera can include a lens stack with a green light filter that allows green light to pass through the optical channel. In many embodiments, the pixels in each focal plane are the same and the light information captured by the pixels is differentiated by the color filters in the corresponding lens stack for each filter plane. Although a specific construction of a camera module with an optic array including color filters in the lens stacks is described above, camera modules including π filter groups can be implemented in a variety of ways including (but not limited to) by applying color filters to the pixels of the focal planes of the camera module similar to the manner in which color filters are applied to the pixels of a conventional color camera. In several embodiments, at least one of the cameras in the camera module can include uniform color filters applied to the pixels in its focal plane. In many embodiments, a Bayer filter pattern is applied to the pixels of one of the cameras in a camera module. In a number of embodiments, camera modules are constructed in which color filters are utilized in both the lens stacks and on the pixels of the imager array.

In several embodiments, an array camera generates image data from multiple focal planes and uses a processor to synthesize one or more images of a scene. In certain embodiments, the image data captured by a single focal plane in the sensor array can constitute a low resolution image (the term low resolution here is used only to contrast with higher resolution images), which the processor can use in combination with other low resolution image data captured by the camera module to construct a higher resolution image through super-resolution processing.

Figure 2:
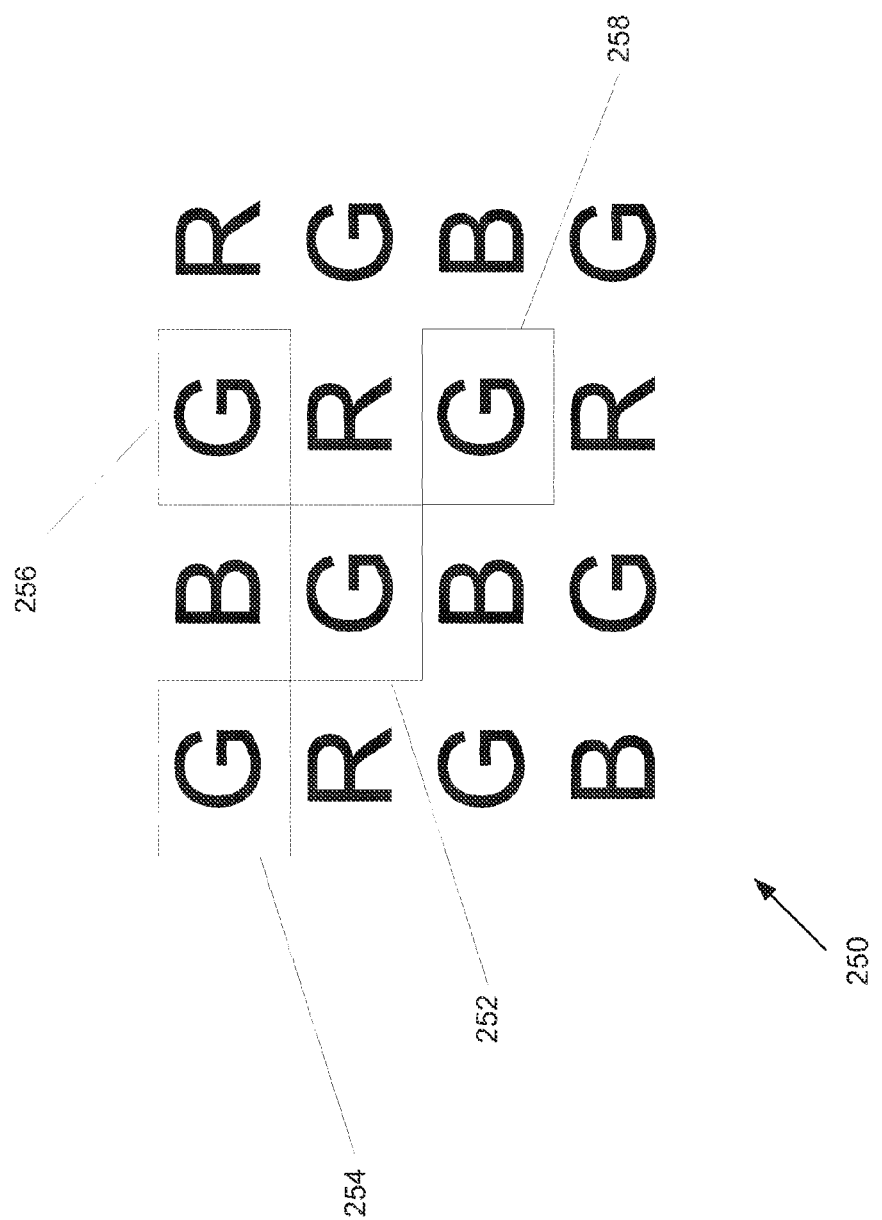
FIG. 2 is a conceptual illustration of a π filter arrangement that can be used in a variety of array camera configurations in accordance with embodiments of the invention.

A 4×4 array camera module including active cameras that capture image data used to synthesize an image from the viewpoint of a reference camera in accordance with embodiments of the invention is illustrated in FIG. 2. The 4×4 camera module 250 includes an arrangement of cameras with color filters such that 3×3 subsets of cameras are patterned using π filter groups. In the illustrated embodiment, a first π filter group includes a green camera at each corner, a green reference camera in the center indicated by a box 252, blue cameras above and below the reference camera, and red cameras to the left and right sides of the reference camera. In several embodiments, the locations of the red and blue cameras within the π filter group are swapped and/or an alternative collection of cameras can be utilized to capture image data to synthesize images. In various embodiments, a second subset of active cameras includes a row of blue, green, and red cameras placed below the π filter group and a column of blue, green, and red cameras placed to the right side of the π filter group with a green camera connecting the row and the column. Although all of the cameras in the array camera module illustrated in FIG. 2 are shown as capturing image data, in many embodiments one or more of the cameras within the array camera module can be idle during image capture to conserve power as appropriate to the requirements of a specific application.

In many embodiments of the invention, one camera is designated as a reference camera capturing image data from a reference viewpoint and a number of cameras with the same color filter as the reference camera are designated alternate view cameras (that capture image data from slightly different viewpoints). In the embodiment illustrated in FIG. 2, a green camera 252 is chosen as reference camera and a plurality of other green cameras in the array including second and third green cameras 254 and 256 are chosen as alternate view cameras. The alternate view cameras can include all other green cameras or a subset of the other green cameras in the array. As will be discussed in greater detail further below, the brightness values of pixels in the alternate view cameras can be summed with the brightness values of pixels in the reference camera to increase the effective exposure time of the pixels relative to the image data capture time.

In various embodiments of the invention, an array can include multiple reference cameras with multiple subsets of alternate view cameras that can be used to synthesize images with summed pixel brightness values from different viewpoints. The diversity of image data from different viewpoints can be used in various applications such as synthesizing higher resolution images with super-resolution processes. In several embodiments of the invention, a green camera indicated by a box 258 is also a reference camera. Image data from alternate view green cameras (that can be different from the alternate view cameras associated with camera 252) are combined with image data from green camera 258 to synthesize image data representative of an image from the viewpoint of the green camera 258. The image data generated from the viewpoint of the green camera 258 can be used in combination with the image data generated from the viewpoint of the green camera 252 in applications that utilize multiple images from different viewpoints such as super-resolution processes.

Although specific array camera module configurations and partitions of cameras into subsets for synthesizing images are discussed above with respect to FIG. 2, partitions of active cameras into subsets for the purpose of capturing image data for synthesizing images can be utilized with any of a variety of camera module configurations such as, but not limited to, array camera modules including any number of cameras, array camera modules in which one or more of the cameras capture image data within multiple color channels (i.e. individual cameras in the array are possibly non-monochromatic), and/or array camera modules in which not all cameras of the camera array are active (i.e. not capturing image data or performing measurements) as appropriate to the requirements of a specific application in accordance with embodiments of the invention. Processes for utilizing array camera architectures with color filters for reducing motion blur in low light conditions is discussed below.

Reducing Motion Blur by Summing Pixel Brightness Values

As explained further above, traditional techniques to increase signal levels when capturing a digital image using image sensors include changing the exposure or gain, with some negative effects in turn. When using an array camera to capture multiple images of the same scene in the same moment an additional factor is available. By adding pixel values/signal levels together between corresponding pixels in the captured image data, a higher "boosted" signal level can be achieved with less of the negative effects of modifying the exposure and/or gain of the cameras. Furthermore, this high signal level can be achieved while lowering exposure and/or gain to decrease their negative effects.

In many embodiments of the invention, a subset of cameras in the array is chosen. Pixel values in a number of images captured by the selected cameras are combined, resulting in a pixel brightness sum corresponding to an effective exposure time equal to the number of summed pixels multiplied by the actual image data capture time. In further embodiments of the invention, because the pixel values are increased by the number of cameras from which pixel values are summed, the gain and/or exposure time of each of the cameras can be reduced accordingly.

Figure 3:
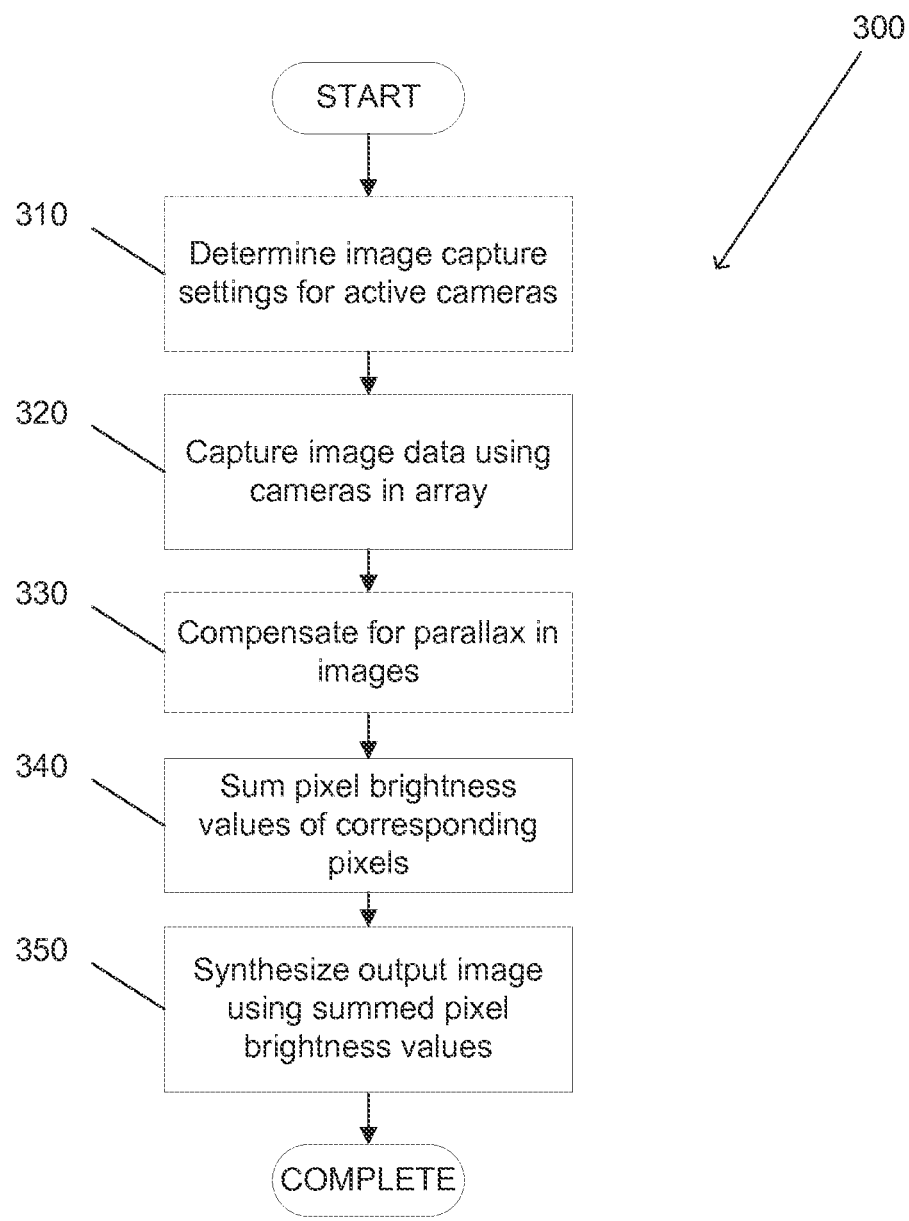
FIG. 3 is a flow chart showing a process for summing pixel brightness values from multiple images obtained using an array camera in accordance with an embodiment of the invention.

A process for generating an image from summed pixel values from multiple images captured by an array camera in accordance with embodiments of the invention is illustrated in FIG. 3. The process 300 includes determining (310) image capture settings for active cameras in an array. Image capture settings can include (but are not limited to) exposure time, analog gain, and frame rate (when capturing video). As will be discussed further below, these settings can be adjusted based on the number of active cameras used.

Image data is captured (320) using a set of active cameras in the array. Typically, each camera produces an image from its point of view and the image data forms images made up of pixel brightness values. In array cameras, often one camera is designated a reference camera and the image data captured by that camera is referred to as being captured from a reference viewpoint. In several embodiments of the invention, the set of active cameras is chosen where the cameras have color filters such that they capture information within the same spectral band (also referred to as color channel). A spectral band can correspond to a human perceptible color (e.g., red, green, blue) or can be non-perceptible (e.g., infrared). As discussed further above, an array camera may utilize a filter pattern such that it contains cameras that separately capture green, red, and blue light (designated green, red, and blue cameras respectively). Therefore, a set of active cameras can include all cameras of one color, such as green cameras.

The pixel brightness values of corresponding pixels in the image data captured from alternate viewpoints are summed (340). Corresponding pixels can refer to pixels that represent the same scene content in each image. Parallax, due to the different fields of view of the active cameras, can affect pixel correspondence. Some pixels that capture the same portion of a scene (i.e. pixel brightness values corresponding to samples of corresponding portions of the object space) may be in different locations in different images due to parallax. In many embodiments of the invention, images are compensated (330) for parallax. Parallax compensation such as applying scene-dependent geometric shifts to the affected pixels is discussed further below. Images can also be compensated for distortions due to the physical characteristics of the particular imager (also referred to as geometric compensation or correction) using scene-independent geometric shifts to align corresponding pixels.

In many embodiments of the invention, one image is designated a reference image and the other images in the set of images are referred to as alternate view images. The designation of a reference image has particular relevance in determining a reference viewpoint and compensating for parallax. Where one image is designated a reference image, the pixels of the reference image are summed with corresponding pixels in alternate view images. In other embodiments, the reference image may be a 'virtual' image synthesized in a location in the array where no physical camera exists. When a 'virtual' image is used, the corresponding pixels from alternate view images can be summed into the grid for a reference viewpoint where image data may not physically exist. Systems and methods for generating a 'virtual' image from the perspective of a given viewpoint include, but are not limited to, those disclosed in U.S. Provisional Application No. 61/707,691 entitled "Synthesizing Images From Light Fields Utilizing Virtual Viewpoints" to Jain, filed Sep. 28, 2012, U.S. application Ser. No. 14/042,275 entitled "Generating Images from Light Fields Utilizing Virtual Viewpoints" to Nisenzon et al., filed Sep. 30, 2013, U.S. Provisional Application No. 61/776,751 entitled "Systems and Methods for Image Data Compression" to McMahon et al., filed Mar. 11, 2013, and U.S. application Ser. No. 14/204,990 entitled "Systems and Methods for Image Data Compression" to McMahon et al., filed Mar. 11, 2014, the disclosures of which are hereby incorporated by reference in their entirety.

An output image is synthesized (350) from the pixel brightness sums. Where a reference image has been designated, values equal to the pixel brightness sums corresponding to pixels in the reference image can be placed in the same locations in the output image. Where multiple references images have been designated, super-resolution processes can be utilized to synthesize a higher resolution image using the pixel brightness sums determined for each of the reference images. In other words, multiple independently summed images can be used as inputs to a super-resolution process to generate a higher resolution image.

In further embodiments of the invention, image capture settings such as exposure time and gain can be adjusted in view of the higher signal levels resulting from the summation. For example, presume image data is captured using a 4×4 array where eight cameras have green filters. Image data can be combined by summing the corresponding pixels from the eight green cameras. Given that that there are eight active green cameras, the pixel brightness values are approximately eight times higher than the pixel brightness values of an image from a single green camera. Under these conditions, the exposure time can be reduced by eight times, having the effect of maintaining the same apparent brightness and noise while reducing the apparent motion blur. Alternatively, the analog gain of cameras can be reduced by eight times, having the effect of reducing the apparent noise in the image while maintaining the same brightness, or the exposure time and the analog gain can each be reduced by an amount (such as half exposure and one quarter analog gain) so that there is a total reduction by a factor of eight.

If multiple images are captured over time to generate a video sequence, the frame rate (i.e., rate at which images are captured) can be adjusted. The theoretical maximum exposure time is the inverse of frame rate. As exposure time is decreased, the frame rate can be increased accordingly. Image capture settings such as exposure time, gain, and frame rate can be determined (310) before the images are captured. Although specific processes for increasing the effective exposure times of pixels in a reference image relative to the actual image data capture time by a factor equal to the number of summed pixels are discussed above with reference to FIG. 3, any of a variety of processes can be utilized to increase effective exposure times of pixels in a reference image by summing the pixel brightness values in the reference image with the pixel brightness values of corresponding pixels in alternate view images can be utilized as appropriate to the requirements of specific applications in accordance with embodiments of the invention. The effects of parallax and techniques to compensate for parallax when summing corresponding pixels to increase effective pixel exposure times in accordance with embodiments of the invention are discussed below.

Disparity and Compensating for Parallax

Images of a scene captured by different cameras in an array camera can have slight differences due to the different fields of view resulting from the different locations of the cameras, an effect known as parallax. These differences, referred to as disparity, provide information that can be used to measure depth of objects within a scene. Once depth information has been determined, scene-dependent geometric shifts can be applied to the pixels of the captured images to remove the differences in the images that resulted from parallax. The modified images then have similar pixels, corresponding to the same observed points in the scene, in the same locations. Systems and methods for detecting and correcting parallax are discussed in U.S. Patent Application Ser. No. 61/691,666 entitled "Systems and Methods for Parallax Detection and Correction in Images Captured Using Array Cameras" to Venkataraman et al. and U.S. Pat. No. 8,619,082, the disclosures of which are incorporated by reference above.

Techniques such as those disclosed in the patent application incorporated above are typically used to generate a depth map from a reference viewpoint. The reference viewpoint can be from the viewpoint of one of the cameras in a camera array. Alternatively, the reference viewpoint can be an arbitrary virtual viewpoint. A depth map indicates the distance of the surfaces of scene objects from a reference viewpoint and can be utilized to determine scene dependent geometric corrections to apply to the pixels from each of the images within captured image data to eliminate disparity when fusing images together as in super-resolution processing (generating a higher-resolution image from multiple lower-resolution images) and/or when summing pixel brightness values for corresponding pixels.

Corrections for parallax may be desired when parallax results in scene differences in the images used for corresponding pixel summation. In several embodiments of the invention, the processes discussed above can be utilized without parallax correction where no objects are within a certain distance or where the minimum depth at which objects appear in the image (or equivalently, disparity) is determined to be below a certain threshold. For example, sparse depth information can be generated for a reference image and the pixel brightness values in the reference view image data are summed with pixel brightness values in alternate view image data when no objects are within a threshold distance according to the generated depth information. In further embodiments of the invention, images can be compensated for parallax in all situations or where the depth of objects in the image is determined to be above a predetermined threshold.

Figure 4:
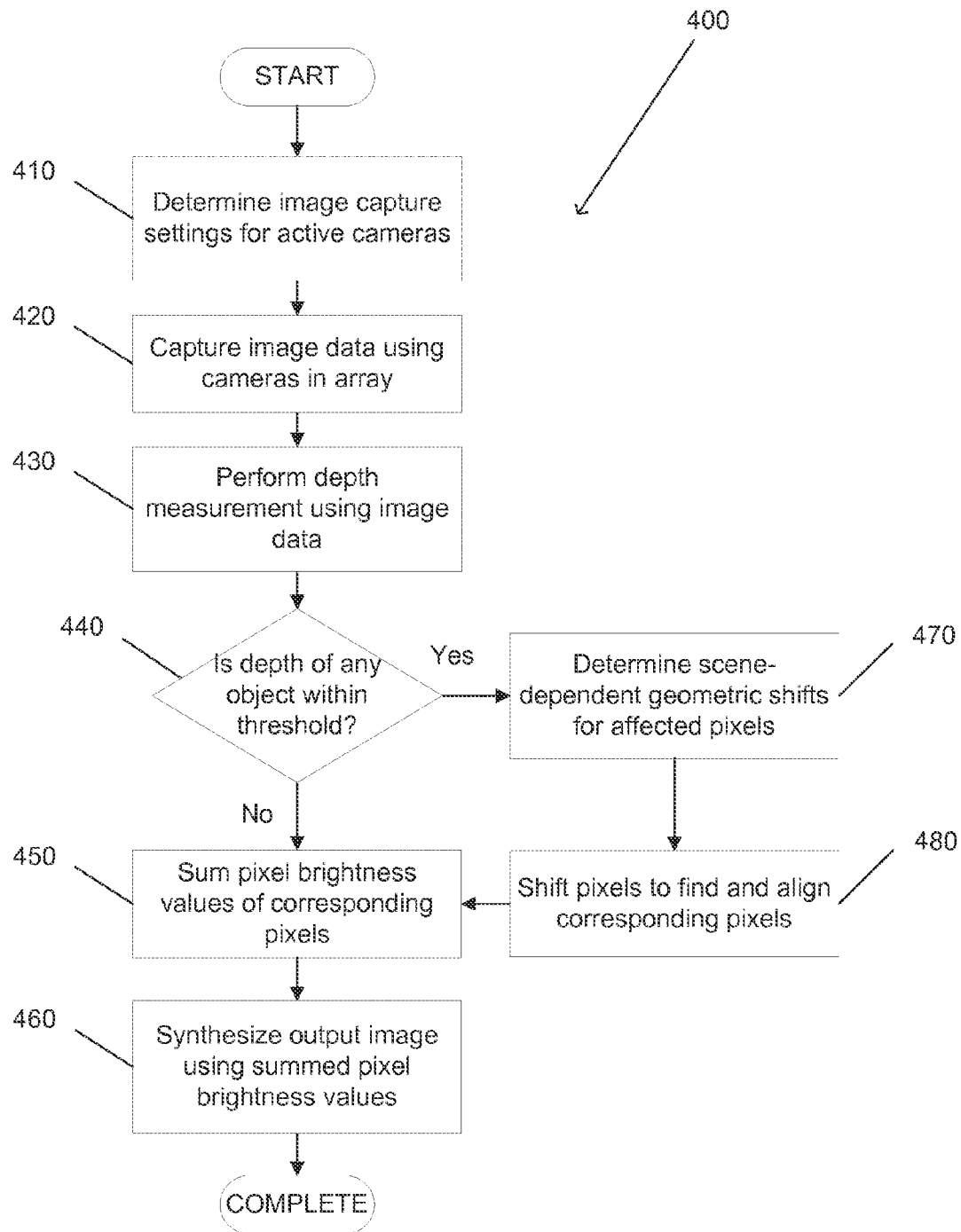
FIG. 4 is a flow chart showing a process for summed pixel brightness values from image data captured from a reference viewpoint and one or more alternate viewpoints in accordance with embodiments of the invention.

A process for generating summed pixel values from image data captured from a reference viewpoint and one or more alternate viewpoints, where parallax detection and correction is utilized to identify corresponding pixels within the image data in the in accordance with embodiments of the invention is illustrated in FIG. 4. Similar to the process described above with respect to FIG. 3, image capture settings can be determined (410) and image data captured (420). Depth measurements are calculated using at least a portion of the image data (430) and a determination is made whether any objects in the scene are within a predetermined threshold depth/distance from the camera (440). If no objects are within the predetermined threshold, pixel brightness values are summed (450) and an output image generated (460). If there is at least one object within the threshold distance, parallax correction is performed. Techniques for correcting for parallax can be utilized in a variety of ways. Processes such as those disclosed in U.S. Provisional Patent Application No. 61/780,974 entitled "Systems and Methods for Synthesizing Images from Image Data Captured by an Array Camera Using Depth Maps in which Depth Estimation Precision and Spatial Resolution Vary" to Venkataraman et al. and U.S. patent application Ser. No. 14/207,254 entitled "Systems and Methods for Synthesizing Images from Image Data Captured by an Array Camera Using Restricted Depth of Field Depth Maps in which Depth Estimation Precision Varies" to Venkataraman et al. can be utilized to correct parallax in images before pixel summing as discussed below. The disclosures of U.S. Patent Application Ser. No. 61/780,974 and Ser. No. 14/207,254 are hereby incorporated by reference in their entirety. In many embodiments of the invention, parallax detection and compensation includes one or more modes as will be discussed below.

In a first mode of operation, referred to here as user plane focus mode, parallax detection and correction is only performed with respect to pixel brightness values that sample objects in the scene that are at a specific focus depth and/or within a specific depth of field relative to the focus depth. The focus depth can be determined from at least one designated region of interest within the captured image and/or a preview image. The region of interest can be a predetermined location (e.g., an auto-focus rectangle in the center of the image) or can be selected by a user in real time. A sparse depth map can be created with higher resolution with respect to regions of the image containing objects that are located within the specified depth of field relative to the specified focus depth. Systems and methods for generating sparse depth maps include, but are not limited to, those disclosed in U.S. Patent Application Ser. No. 61/780,974 and Ser. No. 14/207,254 incorporated by reference above. In some embodiments, the depth detection might occur with denser depth sampling in the desired depth-of-field and less dense depth sampling outside the desired depth-of-field. In other embodiments, the depth of field may be set to be extremely small such that the depth detection might be entirely skipped and the depth map may be assumed to consist only of pixels at the target depth. Using the depth map, the disparity between a reference viewpoint and the alternate viewpoints can be determined (470) using the baseline between each of the alternate view cameras and the reference camera. The disparity can then be used to identify (480) corresponding pixels within the image data based upon the anticipated scene-dependent geometric shifts present in the image data. In this way, the pixels in the reference plane that are in focus are summed using corresponding pixels identified in a manner that accounts for disparity between the reference viewpoint and an alternate viewpoint. In this way, the parallax detection and correction process can reduce any blur that may be introduced by summing pixels that are incorrectly identified as corresponding. After parallax compensation, objects in the target focus depth of field will be aligned across the alternate images and summing the pixels containing those objects provides a higher effective exposure in the final image for those objects. Pixels containing objects not at the target focus depth may not be aligned across the images and summing those pixels may result in blurring. However, there may already be blurring due to the target focus not being set for those objects (they are "out of focus") so the additional blurring may not be visually significant.

In a second mode, referred to here as dense parallax compensated mode, parallax correction is performed for all pixels in an image before being summed. In this mode, a depth map is calculated for all pixels in a reference image and corresponding pixels in the alternate images are identified based upon the scene-dependent geometric shifts (470) (480) with respect to the reference image predicted by the depth map.

In a third mode, all pixels in an image are compensated before being summed. However, the same compensation is applied to all pixels irrespective of their depth indicated on a depth map. The uniform compensation can be based on a chosen depth. In many embodiments, the depth can be determined by identifying a region of interest (using techniques such as those discussed above) and calculating a depth map of the region. In several embodiments, a histogram of the depths in the region is formed. In some embodiments, the histogram can be filtered to eliminate low confidence regions of the depth map such as textureless regions or to admit only high confidence regions such as edges. In many embodiments, the median depth of the histogram is taken to be the desired depth of focus. Systems and methods for determining a depth of focus include, but are not limited to, those disclosed in U.S. Patent Application Ser. No. 61/780,974 and Ser. No. 14/207,254 incorporated by reference above. The depth is then used to compensate all pixels before summing (can be seen as equivalent to setting a depth map to a fixed depth everywhere). This will tend to attenuate regions of the image that are off the desired focal depth (not aligned) and amplify regions which are on or close to the focal depth (aligned). For objects in the reference viewpoint which are actually at or near the target depth, corresponding pixels will naturally align and the summed image will have an appearance of sharpness. For objects in the reference viewpoint which are not actually at or near the target depth, the resulting summed pixel will be an average of many non-corresponding pixels. The resulting image will typically be a synthetic aperture image where objects at the target depth will appear sharper and brighter than objects far from the target depth, which will appear blurred. This mode can allow reduced computation in situations where parallax processing is too computationally demanding, or in applications where the scene content is typically at a fixed depth (such as usually beyond a certain distance). In many embodiments, once the final image is summed it is divided or multiplied by a scale factor as needed to set a desired target brightness for final output.

When image data is captured from different perspectives and the scene includes foreground objects, the disparity in the location of the foreground object in each of the images results in portions of the scene behind the foreground object being visible in some but not all of the images. A pixel that captures image data concerning a portion of a scene, which is not visible in images captured of the scene from other viewpoints, can be referred to as an occluded pixel. These occlusions can be detected by determining whether there is a great difference between pixels that should correspond according to depth map and disparity calculations. In many embodiments, at least some portions of images that have these occlusions are not included in the summation to avoid creating artifacts. Systems and methods for detecting occlusions and correcting for parallax include, but are not limited to, those described in U.S. Patent Application Ser. No. 61/691,666 and U.S. Pat. No. 8,619,082 incorporated by reference above.

In several embodiments, where occluded pixels are detected, only those pixels corresponding to pixels visible in the reference image can be used in the summation. In many embodiments, the occluded pixels can be left out of the summation. If pixels are left out of the summation, the total of the pixels that are summed should be scaled by a factor to match the brightness of the other summed pixels. The factor can be determined by dividing the total number of images that could potentially include the pixel by the number of cameras that actually observe that pixel. For example assume $N_g$ cameras are summed for areas of an image where all pixels are visible and $N_{gv}$ cameras have visibility of certain pixels in an occluded area. Those pixels with visibility are summed and the sum is multiplied by a factor of $N_g/N_{gv}$ to compensate for the pixels left out.

Although specific techniques for parallax compensation are discussed above with respect to processes for summing pixel brightness values, any of a variety of processes can be utilized to correct parallax in accordance with embodiments of the invention. Temporal frame compensation in accordance with embodiments of the invention is discussed below.

Motion-Compensated Temporal Filtering

Noise and signal performance of array cameras in low light conditions can be further improved by temporal frame compensation. Multiple frames are captured of a scene over time (e.g., frames captured at times N−1, N, and N+1). For each pixel a motion compensation vector is determined between each frame. The motion compensation vector can be calculated between individual camera images captured for each frame or between summed images formed from the images corresponding to each frame (that is, summed image at N−1, summed image at N, and image at N+1). Using the motion compensation vectors, the brightness values of corresponding pixels between frames are added to generate an image representing the sum of images from multiple cameras and multiple frames. This summation can be divided to produce an average (which may tend to reduce noise) or can be compensated for by reducing exposure time (which may tend to reduce motion blur). Producing a color image from image data captured within discrete narrow spectral bands in accordance with embodiments of the invention is discussed below.

Combining Image Data Captured in Narrow Spectral Bands into a Color Image

When utilized with sets of cameras that capture a single color, the techniques discussed above generally produce a monochrome image in that color. In many embodiments of the invention, a composite color RGB image can be formed from monochrome images of different colors (i.e., separate color channels). As discussed above, a monochrome image can be formed by summing pixel brightness values of images from a set of cameras with the same color filter in an array. The array can contain sets of green cameras, red cameras, and blue cameras. Recognizing that the number of cameras in each set may not be equal, the summed pixel brightness values can be normalized across the sets of cameras and the summed images can be combined into a color image.

Assuming the set of green cameras has the largest number of cameras, the images from the sets of red and blue cameras can be normalized as follows. A green image is generated using the processes described above to sum pixel brightness values from green cameras. Similarly, a red image is generated from the red cameras and a blue image is generated from the blue cameras. The pixel brightness values of the red image are increased by a factor $N_g/N_r$, where $N_g$ is the number of green cameras and $N_r$ is the number of red cameras. Similarly, the pixel brightness values of the blue image are increased by a factor $N_g/N_b$, where $N_b$ is the number of blue cameras. The images can then be combined into a color image where the relative color levels are correct with respect to each other. Increasing the signal levels for normalization can be accomplished in a variety of ways including increasing the analog gain of cameras or multiplying the signal in the digital domain after analog-to-digital conversion.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed is:

1. A method for synthesizing an image from multiple images captured from different viewpoints using an array camera in low light conditions, the method comprising:
    capturing image data using a plurality of active cameras within an array camera, where the plurality of active cameras are configured to capture image data within the same spectral band and the image data captured by the active cameras comprises pixel brightness values that form a reference image and a plurality of alternate view images captured from different viewpoints;
    applying geometric shifts to shift the plurality of alternate view images to the viewpoint of the reference image using the processor configured by software;
    summing the pixel brightness values for pixels in the reference image with pixel brightness values for corresponding pixels in the alternate view images to create pixel brightness sums for the pixel locations in the reference image using the processor configured by software; and
    synthesizing an output image from the viewpoint of the reference image using image data comprising the pixel brightness sums for the pixel locations in the reference image using the processor configured by software.

2. The method of claim 1, wherein applying geometric shifts to shift the plurality of alternate view images to the viewpoint of the reference image further comprises applying scene independent geometric shifts to the alternate view images to compensate for distortions due to physical characteristics of the plurality of active cameras that captured the alternate view images.

3. The method of claim 2, further comprising:
    performing parallax detection using the processor configured by software to identify scene dependent geometric shifts to apply to the alternate view images by comparing the reference image and the alternate view images;

wherein applying geometric shifts to shift the plurality of alternate view images to the viewpoint of the reference image further comprises applying scene dependent geometric shifts to the plurality of alternate view images to compensate for parallax.

4. The method of claim 3, further comprising:
identifying pixels in the alternate view images that are occluded in the reference image using the processor configured by software; and
leaving occluded pixels out when summing the pixel brightness values for pixels in the reference image with pixel brightness values for corresponding pixels in the alternate view images using the processor configured by software.

5. The method of claim 2, further comprising:
performing parallax detection using the processor configured by software to identify scene dependent geometric shifts to apply to at least a portion of the pixels in the alternate view images by comparing the reference image and the alternate view images; and
when parallax detection identifies at least one pixel within a threshold distance of the reference viewpoint, applying scene dependent geometric shifts to the plurality of alternate view images to compensate for parallax.

6. The method of claim 2, further comprising:
performing parallax detection using the processor configured by software to identify scene dependent geometric shifts to apply to at least a portion of the pixels in the alternate view images by comparing the reference image and the alternate view images; and
when parallax detection determines that a pixel from the reference viewpoint has a depth within a specified depth of field, applying scene dependent geometric shifts to corresponding pixels in the alternate view images to compensate for parallax.

7. The method of claim 6, further comprising receiving user input specifying a depth of field via a user interface using the processor configured by software.

8. The method of claim 6, further comprising automatically determining a specified depth of field based upon a depth of an object within a region of interest using the processor configured by software.

9. The method of claim 2, wherein applying geometric shifts to shift the plurality of alternate view images to the viewpoint of the reference image further comprises applying a fixed parallax shift to the plurality of alternate view images.

10. The method of claim 9, further comprising determining the fixed parallax shift based upon user input specifying a depth received via a user interface using the processor configured by software.

11. The method of claim 9, further comprising automatically determining a fixed parallax shift based upon a depth of an object within a region of interest using the processor configured by software.

12. The method of claim 11, wherein automatically determining a fixed parallax shift based upon a depth of an object within a region of interest further comprises:
calculating a depth map for a region of interest;
generating a histogram of depths in the region of interest; and
determining the depth of an object within the region of interest as the median depth of the region of interest.

13. The method of claim 1, further comprising:
capturing a second set of image data using the plurality of active cameras and synthesizing a second output image using the processor configured by software;
calculating motion compensation vectors for the second output image using the processor configured by software;
applying motion compensation shifts to shift the second output image to the viewpoint of the output image using the processor configured by software;
summing the pixel brightness values for pixels in the output image with pixel brightness values for corresponding pixels in the second output image to create pixel brightness sums for the pixel locations in the output image using the processor configured by software; and
synthesizing a motion compensated output image from the viewpoint of the reference image using the pixel brightness sums for the pixel locations in the output image using the processor configured by software.

14. The method of claim 1, wherein the plurality of active cameras that capture the reference image and the alternate view images form a first subset of cameras and the method further comprises:
capturing image data using a second subset of active cameras within the array camera, where the second subset of active cameras are configured to capture image data within the same spectral band as the first subset of cameras and the image data captured by the active cameras comprises pixel brightness values that form a second reference image and a second set of alternate view images captured from different viewpoints;
applying geometric shifts to shift the second set of alternate view images to the viewpoint of the second reference image using the processor configured by software;
summing the pixel brightness values for pixels in the second reference image with pixel brightness values for corresponding pixels in the second set of alternate view images to create pixel brightness sums for the pixel locations in the second reference image using a processor configured by software;
synthesizing an alternate view output image from the viewpoint of the second reference image using the pixel brightness sums for the pixel locations in the second reference image using the processor configured by software; and
synthesizing a high resolution image using the processor configured by software to perform a super resolution process based upon the output image and the alternate view output image.

15. The method of claim 1, wherein the array camera comprises cameras that capture image data within different spectral bands.

16. The method of claim 15, wherein the cameras in the array camera capture image data within spectral bands selected from the group consisting of: red light; green light; blue light; and infrared light.

17. The method of claim 15, wherein at least one camera in the array camera is a Bayer camera.

18. The method of claim 1, wherein:
the array camera comprises a plurality of red cameras, blue cameras, and green cameras, where the number of green cameras is larger than the number of red cameras and larger than the number of blue cameras;
the plurality of cameras are a plurality of green cameras and the output image is a green output image;
the method further comprises:

capturing a second set of image data using a plurality of active red cameras and synthesizing a red output image using the processor configured by software;

capturing a second set of image data using a plurality of active blue cameras and synthesizing a blue output image using the processor configured by software;

increasing pixel brightness values of the red output image by a factor $N_g/N_r$, where $N_g$ is the number of green cameras and $N_r$ is the number of red cameras using the processor configured by software;

increasing pixel brightness values of the blue output image by a factor $N_g/N_b$, where $N_b$ is the number of blue cameras using the processor configured by software; and combining the red, green, and blue output images into a color image using the processor configured by software.

19. The method of claim 1, wherein the array camera comprises an array camera module comprising:

an imager array including an array of focal planes, where each focal plane comprises an array of light sensitive pixels; and an optic array including an array of lens stacks, where each lens stack creates an optical channel that forms an image on the array of light sensitive pixels within a corresponding focal plane;

wherein pairings of lens stacks and focal planes form multiple cameras including the plurality of active cameras.

20. The method of claim 19, wherein the lens stacks within the optical channels sample the same object space with sub-pixel offsets to provide sampling diversity.

* * * * *